United States Patent
Ferreira Da Cunha et al.

(10) Patent No.: US 11,435,205 B2
(45) Date of Patent: Sep. 6, 2022

(54) INDUCTIVE POSITION SENSOR WITH OFFSET COMPENSATION

(71) Applicant: ELECTRICFIL AUTOMOTIVE, Beynost (FR)

(72) Inventors: Jean-Philippe Ferreira Da Cunha, Montluel (FR); Rainer Möller, Chaponnay (FR)

(73) Assignee: ELECTRICFIL AUTOMOTIVE, Beynost (FR)

( * ) Notice: Subject to any disclaimer, the term of this patent is extended or adjusted under 35 U.S.C. 154(b) by 0 days.

(21) Appl. No.: 17/267,162

(22) PCT Filed: Sep. 11, 2019

(86) PCT No.: PCT/FR2019/052102
§ 371 (c)(1),
(2) Date: Feb. 9, 2021

(87) PCT Pub. No.: WO2020/053525
PCT Pub. Date: Mar. 19, 2020

(65) Prior Publication Data
US 2021/0302206 A1    Sep. 30, 2021

(30) Foreign Application Priority Data
Sep. 12, 2018 (FR) ...................... 18 58180

(51) Int. Cl.
*G01D 5/20* (2006.01)
*G01D 5/22* (2006.01)

(52) U.S. Cl.
CPC .......... *G01D 5/2053* (2013.01); *G01D 5/225* (2013.01)

(58) Field of Classification Search
CPC .... G01D 5/204; G01D 5/2053; G01D 5/2225; G01D 5/225; G01D 5/2275; G01D 5/2291
See application file for complete search history.

(56) References Cited

U.S. PATENT DOCUMENTS 5,886,519 A * 3/1999 Masreliez .............. G01B 7/003
                                              336/131
6,483,295 B2 * 11/2002 Irie ........................ G01D 5/204
                                              324/207.16
(Continued)

FOREIGN PATENT DOCUMENTS

FR    3 023 611 A1    1/2016
GB    2 167 563 A     5/1986

OTHER PUBLICATIONS

International Search Report, dated Nov. 22, 2019, corresponding to International Application No. PCT/FR2019/052102.
(Continued)

*Primary Examiner* — Steven L Yeninas
(74) *Attorney, Agent, or Firm* — Ladas & Parry LLP; Malcolm J. MacDonald

(57) ABSTRACT

An inductive position sensor for determining the position of a moving body along a linear or rotary path (F), including:
a moving target (3) adapted to modify an electromagnetic field;
a fixed circuit board (5) extending along a limited portion and including a primary coil (7) surrounding two secondary coils (8, 9) having substantially identical lengths (L) and having shapes of sine and cosine functions;
a current generator (11) to create an inductive coupling modulated by the position of the target;
a detector (13) of the linear or angular position of the target;

(Continued)

and a system for balancing the coupling between the primary coil (7) and the secondary coils (8, 9) to compensate for the measurement offset induced by the proximity between the secondary coils (8, 9) and the end segments (7*b*) of the primary coil (7).

4 Claims, 4 Drawing Sheets

(56) References Cited

U.S. PATENT DOCUMENTS

| | | |
|---|---|---|
| 2014/0225600 A1 | 8/2014 | Fontanet et al. |
| 2020/0018623 A1* | 1/2020 | Jones .................. G01D 5/2073 |
| 2020/0271480 A1* | 8/2020 | Shaga .................. G01D 5/2073 |

OTHER PUBLICATIONS

French Search Report, dated Jun. 11, 2019, corresponding to French Application No. 18 58180.

* cited by examiner

INDUCTIVE POSITION SENSOR WITH OFFSET COMPENSATION

The present invention concerns the technical field of inductive position sensors by eddy current coupling.

The present invention finds applications for determining the linear or angular position of moving parts, for example in vehicles, engines or machine tools.

The state of the art has proposed various solutions of inductive sensors by eddy current coupling for measuring the position of a moving body along a linear or angular path.

In order to determine the linear position of a moving body, U.S. Pat. No. 6,483,295 describes a position sensor including a movably mounted target in displacement with respect to a card or a printed circuit board which is fixed. The circuit card includes a primary coil linked to an alternating current generator that allows generating a magnetic field during the flow of current in said primary coil. This primary coil surrounds secondary coils. The magnetic field thus created is perceived by the secondary coils and induces a current in said secondary coils.

The target is made of a conductive material to allow the flow of eddy currents. This target is moved linearly with respect to the primary and secondary coils. The inductive coupling between the primary coil and the secondary coils is modulated by the position of the target. The geometries of the secondary coils are chosen such that the induced signals delivered by the secondary coils depend on the position of the target. A detector connected to the secondary coils allows determining, from the induced signals derived from the secondary coils, the position of the target.

However, it appears that at least one of the secondary coils does not have a symmetrical shape with respect to the ends of the primary coil. This dissymmetry of configuration in a secondary coil causes the appearance of a shift measurement signal or measurement offset. In order to overcome this drawback, U.S. Pat. No. 6,483,295 proposes to reduce the size of a secondary coil at the ends of the primary coil. This solution has the drawback of reducing the linear measurement portion for a constant space requirement of the sensor.

In the field of angular position measurement sensors, patent FR 3 023 611 proposes, in order to overcome the problem of concentration of the field lines at the ends of the primary coil, to produce in particular the secondary coils by tracks delimiting full meshes. This solution has the drawback of increasing the size of the circuit whose primary coil surrounds the two secondary coils.

Likewise, document GB 2 167 563 describes a position or speed sensor by eddy current coupling. According to embodiments, this document proposes to make the target in several parts in order to obtain a linear signal or to implement several secondary coils to obtain a clear signal over the entire stroke. Such solutions do not allow compensating for the measurement offset.

U.S. Pat. No. 5,886,519 also describes a position sensor proposing in particular to compensate for the manufacturing tolerances or other constraints tending to create a signal shift, to modify the size and shape of the secondary coils or the distance between the primary coil and the secondary coils which is of at least one period. This solution leads to an increase in the size of the sensor.

The present invention therefore aims at overcoming the drawbacks of the prior art by proposing a new inductive sensor for determining the linear or angular position of a moving body, making it possible to reduce the measurement offset while maintaining the measurement range over the entire production range of the secondary coils.

To achieve such an objective, the inductive position sensor for determining the position of a moving body along a linear or rotary path according to the invention includes:
- a target moving along the path adapted to modify an electromagnetic field;
- a fixed circuit board extending in relation to the target along a limited portion with respect to the path and including a primary coil surrounding two secondary coils having substantially identical lengths and having shapes of sine and cosine functions, each secondary coil including at least one outward track and at least one return track;
- a current generator for the primary coil or the secondary coils to create between the primary coil and the secondary coils an inductive coupling modulated by the position of the target;
- a detector of the linear or angular position of the target from the induced signals derived from the secondary coils or from the primary coil;
- and a system for balancing the coupling between the primary coil and the secondary coils to compensate for the measurement offset induced by the proximity between the secondary coils and the end segments of the primary coil.

In addition, the sensor according to the invention may further include in combination at least either of the following additional characteristics:
- the length of the primary coil is greater than the length of the secondary coils so that each end segment of the primary coil is located with respect to the neighboring ends of the secondary coils, at a distance of less than 10 millimeters or ¼ of the period of the secondary coils;
- the coupling balancing system includes at least one compensation capacitor mounted between the primary coil and a secondary coil;
- the coupling balancing system includes for at least one secondary coil, at least one shift between the mean line or the mean radius of the outward track and the mean line or the mean radius of the return track of said secondary coil, along a direction perpendicular to the path and along a way ensuring a decrease in the shape of the secondary coil located at the end segments of the primary coil;
- the shift between the mean line or mean radius of the outward track and the mean line or mean radius of the return track of said secondary coil is symmetrical with respect to the mean line or radius of the tracks of the other coil;
- the coupling balancing system is produced by a modulation of the shape of the secondary coils to ensure a decrease in the shape of the coils at the end segments of the primary coil;
- for a rotary path target, the shapes of the outward track and of the return track of the sine secondary coil are described by the following formulation:

$$Y\text{outward}(\theta) = Y\text{moy\_outward} + E(\theta)^*(A1^*\sin(a^*\theta+\phi1) + A2^*\sin(2^*a^*\theta+\phi2) + A3^*\sin(3^*a^*\theta+\phi3) \ldots + An^*\sin(n^*a^*\theta+\phi n));$$

$$Y\text{return}(\theta) = Y\text{moy\_return} + E(\theta)^*(-A1^*\sin(a^*\theta+\phi1) - A2^*\sin(2^*a^*\theta+\phi2) - A3^*\sin(3^*a^*\theta+\phi3) \ldots - An^*\sin(n^*a^*\theta+\phi n));$$

and for the cosine secondary coil (9):

$$Y\text{outward}(\theta) = Y\text{moy\_outward} + E(\theta)^*(A1^*\cos(a^*\theta+\phi1) + A2^*\cos(2^*a^*\theta+\phi2) + A3^*\cos(3^*a^*\theta+\phi3) \ldots + An^*\cos(n^*a^*\theta+\phi n));$$

$$Yreturn(\theta)=Ymoy\_return+E(\theta)*(-A1*cos(a*\theta+\phi1)-A2*cos(2*a*\theta+\phi2)-A3*cos(3*a*\theta+\phi3)\ldots-An*cos(n*a*\theta+\phi n));$$

with $E(\theta)$ a wrapper function;

for a linear displacement target, the shapes of the outward track and of the return track of the sine secondary coil are described by the following formulation:

$$youtward(x)=Ymoy\_outward+E(x)*(A1*sin(a*x+\phi1)+A2*sin(2*a*x+\phi2)+A3*sin(3*a*x+\phi3)\ldots+An*sin(n*a*x+\phi n));$$

$$yreturn(x)=Ymean\_return+E(x)*(-A1*sin(a*x+\phi1)-A2*sin(2*a*x+\phi2)-A3*sin(3*a*x+\phi3)\ldots-An*sin(n*a*x+\phi n));$$

and for the cosine secondary coil:

$$youtward(x)=Ymoy\_outward+E(x)*(A1*cos(a*x+\phi1)+A2*cos(2*a*x+\phi2)+A3*cos(3*a*x+\phi3)\ldots+An*cos(n*a*x+\phi n));$$

$$yreturn(x)=Ymoy\_return+E(x)*(-A1*cos(a*x+\phi1)-A2*cos(2*a*x+\phi2)-A3*cos(3*a*x+\phi3)\ldots-An*cos(n*a*x+\phi n));$$

with $E(x)$ a wrapper function;

the wrapper function has a maximum value at the center of the primary coil.

Various other characteristics emerge from the description given below with reference to the appended drawings which show, by way of non-limiting examples, embodiments of the object of the invention.

As it appears more specifically in the Figures, the object of the invention concerns a position sensor 1 for a moving body in the general sense not represented and whose position is to be determined along a linear or angular path F.

The position sensor 1 includes a stator part 2 and a target 3 movably mounted along a path F. Thus, the target 3 is driven by the moving body or is arranged on the moving body whose position is to be determined. The target 3 is made of a conductive material such as metal material, to allow the flow of eddy currents.

Figure 1:
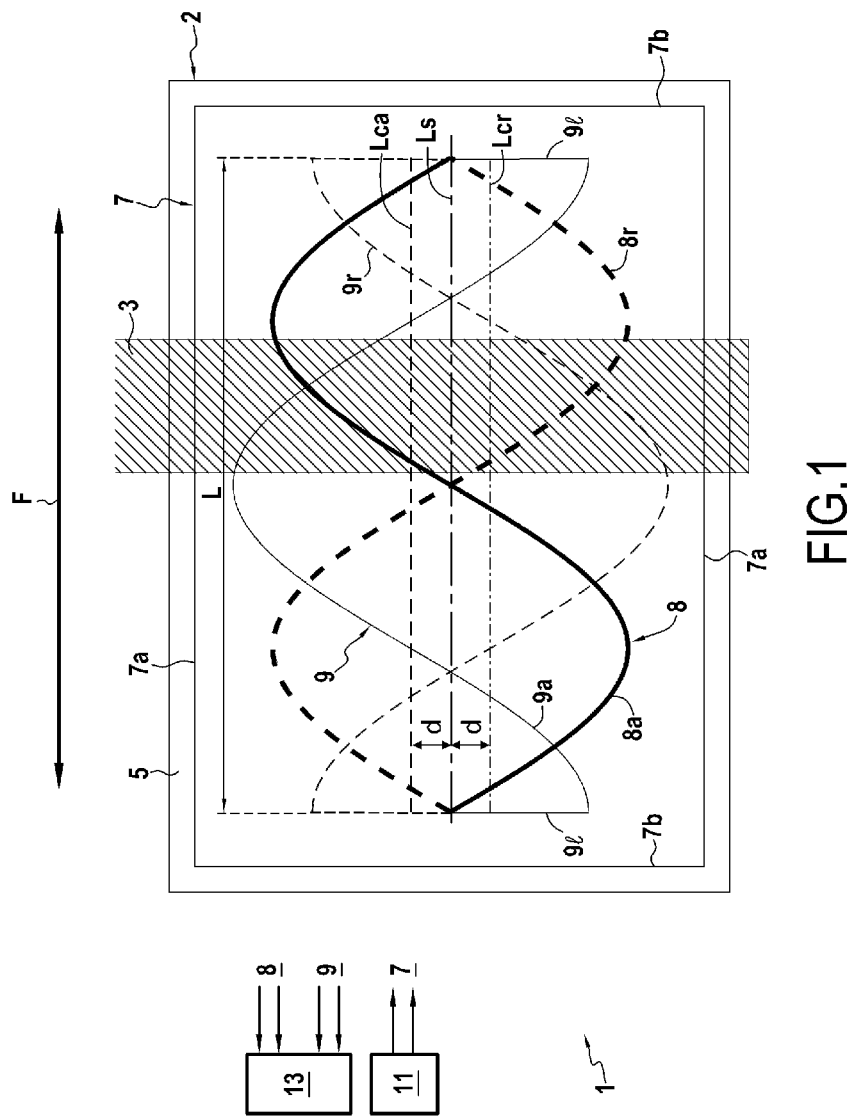
FIG. 1 is a schematic view of a first embodiment of a position sensor according to the invention.

Referring to FIG. 1, the stator part 2 of the position sensor 1 is produced over a limited length corresponding to the stroke of the moving body, i.e. of the target 3. The stator part 2 includes a card or a circuit board 5 which is fixedly mounted with respect to the target 3. In a known manner, the circuit board 5 includes a primary coil 7 surrounding only two secondary coils 8, 9 magnetically coupled to the primary coil 7. The primary coil 7 thus has two main segments 7*a* extending parallel to each other and to the path F and two end segments 7*b* extending parallel to each other but perpendicularly with respect to the path F.

Typically, an alternating current generator 11 is connected to the primary coil 7 that allows generating a magnetic field when a current flows in said primary coil. The magnetic field thus created is perceived by the secondary coils 8, 9 and induces a voltage in said secondary coils. For example, the current generator 11 delivers a high-frequency alternating current, allowing the establishment of eddy currents in the target 3.

The inductive coupling between the primary coil 7 and the secondary coils 8, 9 is modulated by the position of the target 3. The target 3 modifies the magnetic coupling between the primary coil 7 and the two secondary coils 8, 9. These secondary coils 8, 9 are linked to a detector 13 which, by measuring the electric voltages induced at the terminals of the secondary coils 8, 9, allows deducing the accurate position of the target 3. As a consequence, the detector 13 allows determining the position of the moving body.

According to this configuration, the primary coil 7 is referred to as "transmitter coil" while the secondary coils 8, 9 are referred to as "receiver coils". It should be noted that a reverse operation can be envisaged for which the current generator 11 is linked to the secondary coils 8, 9 which are transmitters while the primary coil 7 is a receiver coil and to which the detector 13 from which the phase of the induced signal allows deducing the accurate position of the target 3 is connected.

For the sake of clarity of the drawings, the inlets and outlets of the coils 7, 8, 9 are not represented. Likewise, each coil is represented by an outward track and by a return track forming a loop or a winding. Of course, each coil 7, 8, 9 can include several outward tracks and several return tracks. The outward track and the return track of each coil have suitable shapes making it possible to delimit meshes therebetween.

It should be noted that the length of the secondary coils 8, 9 taken along the path F defines the window for measuring the position sensor 1. According to one characteristic of the invention, the two secondary coils 8, 9 are arranged such that their two ends are located on two lines perpendicular to the path F and separated by a distance L. Thus, the two secondary coils 8, 9 have a substantially identical length L, taken along a direction parallel to the path F and corresponding to the window for measuring the position sensor 1.

Figure 3:
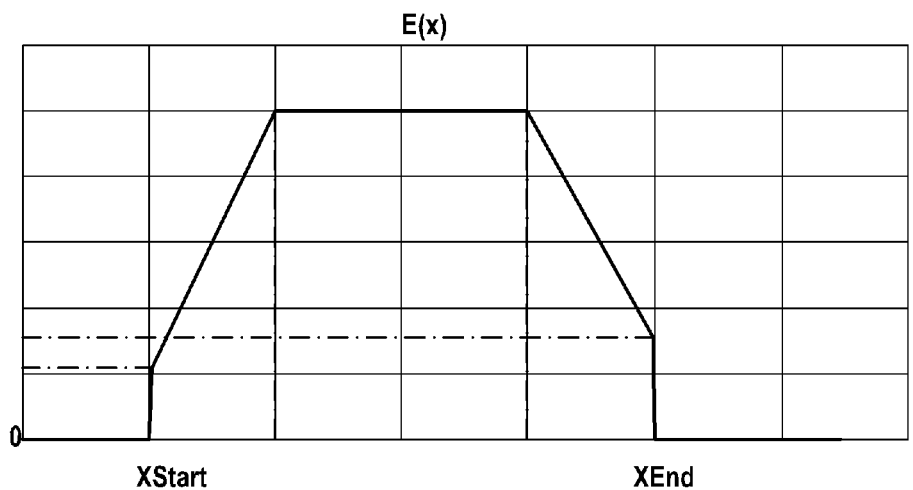
FIG. 3 is a view of a trapezoidal type wrapper function implemented for defining the shape of the secondary coils for a third embodiment of the sensor according to the invention.
Figure 4:
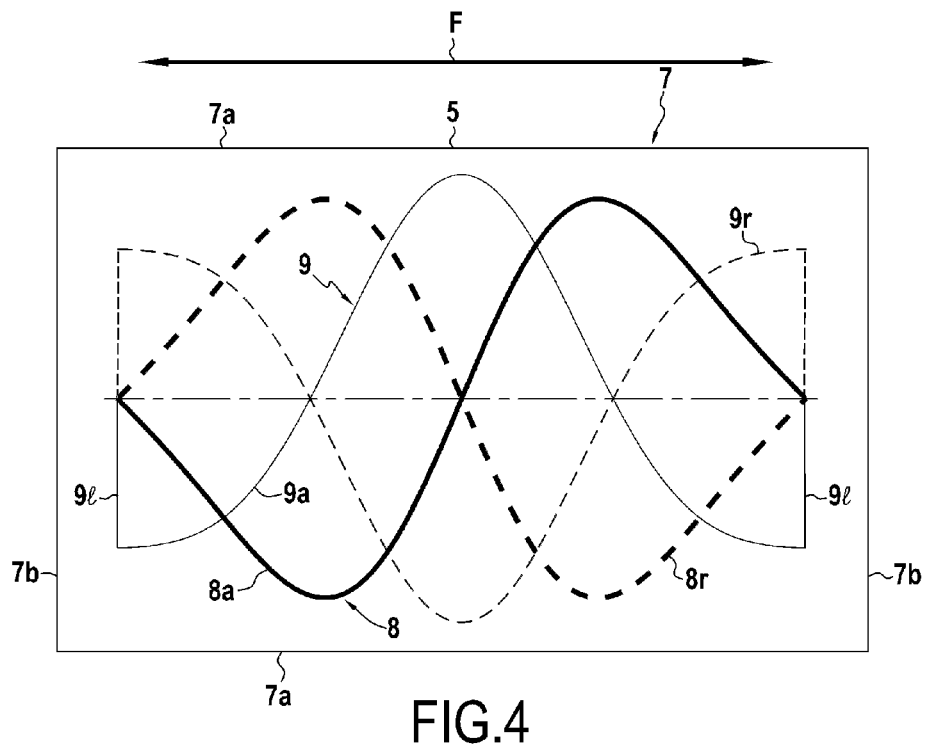
FIG. 4 is a schematic view of a third embodiment of a position sensor according to the invention.
Figure 5:
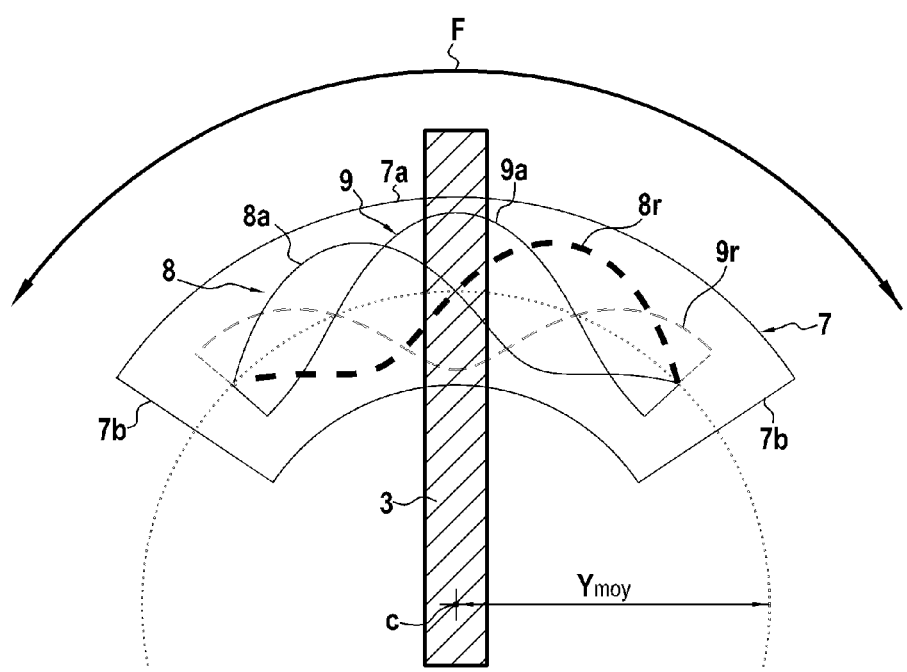
FIG. 5 is a schematic view of an angular position sensor according to the invention implementing the third embodiment.

In the examples illustrated in FIGS. 1 and 3, the path represented by the arrow F is linear so that the configuration of the coils is made along a linear direction. Of course, the configuration of the coils illustrated in FIGS. 1 and 3 can be understood for an angular path. Thus, the configuration of the coils is made along an angular direction as illustrated for example in FIG. 5. FIGS. 4 and 5 thus show the same configuration of the coils for respectively a linear path and an angular path.

In a known manner, in the presence of the target 3 in the measurement window, the secondary coils 8, 9 placed in the vicinity of said target 3 have an amount of flux of the magnetic field lower than if the target 3 were absent. Each secondary coil 8, 9 generally consists of meshes of opposite orientations so that when the target 3 moves above one then the other of these meshes, the secondary coil has, with respect to a zero mean value, a relative increase and then a relative decrease in the amount of flux of the magnetic field which crosses it. Generally, there is a distinction between, on the one hand, a secondary coil having a shape of a sine function called "sine" 8 adapted to deliver a sine signal when a target 3 passes through the measurement window and a secondary coil having a shape of a cosine function called "cosine" 9 adapted to deliver a cosine signal when a target 3 passes through the measurement window. The sine/cosine signals which are transmitted to the detector 13 allow determining the accurate angular or linear position of the target by calculating the arc tangent.

As recalled in the preamble of the present application, the sinusoidal signals are obtained with secondary coils of sinusoidal shape only if the magnetic field created by the primary coil is constant over time and homogeneous over the entire area of the secondary coils, which is not the case with the magnetic field created by the primary coil 7 whose measurement range is limited.

According to the invention, the inductive position sensor includes a system for balancing the coupling between the primary coil 7 and the secondary coils 8, 9, adapted to compensate for the measurement offset. This balancing system is adapted to compensate for the measurement offset induced by the proximity between the secondary coils 8, 9 and the end segments 7b of the primary coil 7. In this regard, the length of the primary coil 7 is slightly greater than the length L of the secondary coils 8, 9. Typically, each end segment 7b of the primary coil is located with respect to the neighboring ends of the secondary coils 8, 9, at a distance less than 10 millimeters or ¼ of the period of the secondary coils 8, 9.

The following description describes three embodiments of such a balancing system aiming at reducing this measurement offset.

FIG. 1 illustrates a first embodiment for which the coupling balancing system includes, for at least one secondary coil 8, 9, at least one shift between the mean line of the outward track and the mean line of the return track, along a direction perpendicular to the path F and along a way ensuring a decrease in the shape of the secondary coil located at the end segments 7b of the primary coil 7.

In the illustrated example, a secondary coil 8 has the shape of a sine function and consists of an outward track 8a and of a return track 8r delimiting therebetween a first mesh and a second mesh. The secondary coil 9 has the shape of a cosine function and consists of an outward track 9a and of a return track 9r delimiting therebetween a first half-mesh, a central mesh and a second half-mesh. It should be noted that, according to this embodiment, the secondary coils 8, 9 have the exact shapes of the sine and cosine functions respectively.

The ends of the outward track 8a and of the return track 8r of the sine secondary coil 8 located in the vicinity of each end segment 7b of the primary coil are positioned at the same location so that the outward track 8a and the return track 8r of the sine secondary coil 8 has a common mean line Ls. This mean line Ls is parallel to the path F.

The outward track 9a and the return track 9r of the cosine secondary coil 9 are shifted along a direction perpendicular to the path F and along a way ensuring a decrease in the shape of the secondary coil located at the end segments 7b of the primary coil 7. It should be considered that the outward 9a and return 9r tracks of the cosine secondary coil 9 are shifted in consideration of a conventional configuration of a cosine function centered on the shape of a sine function. Thus, the outward track 9a and the return track 9r of the cosine secondary coil 9 are linked, at their ends, by a linking track 91 extending perpendicularly to the path F.

The outward track 9a of the cosine secondary coil 9 is shifted such that its mean line Lca is shifted by a value +d with respect to the mean line Ls of the sine secondary coil 8. Likewise, the return track 9r of the cosine secondary coil 9 is shifted such that its mean line Lcr is shifted by a value −d with respect to the mean line Ls of the sine secondary coil 8. Thus, the shift between the mean line Lca of the outward track 9a and the mean line of the return track 9r of the cosine secondary coil is symmetrical with respect to the mean line of the tracks of the sine secondary coil. It is noted that when the path F is angular, the mean lines correspond to the mean radii.

In addition, the outward track 9a and the return track 9r of the cosine secondary coil 9 are shifted along a way ensuring a decrease in the shape of the cosine secondary coil located at the end segments 7b of the primary coil 7. Thus, it clearly appears from FIG. 1 that the half-meshes of the cosine secondary coil 9 have smaller amplitude than the amplitude of the central mesh of the cosine secondary coil 9. Such a modification of the shape of the cosine secondary coil 9 in relation to the end segments 7b allows balancing the coupling between the primary coil 7 and the cosine secondary coil 9. As recalled in the preamble of the present application, the sinusoidal signals are obtained with secondary coils of sinusoidal shape only if the magnetic field created by the primary coil is constant over time and homogeneous over the entire area of the secondary coils, which is not the case with the magnetic field created by the primary coil 7, in particular at the ends. Reducing the amplitude of the two half-meshes at the ends of the cosine coil 9 in favor of the central mesh allows balancing the contribution of each of the meshes and therefore decreasing the measurement offset.

Figure 2A:
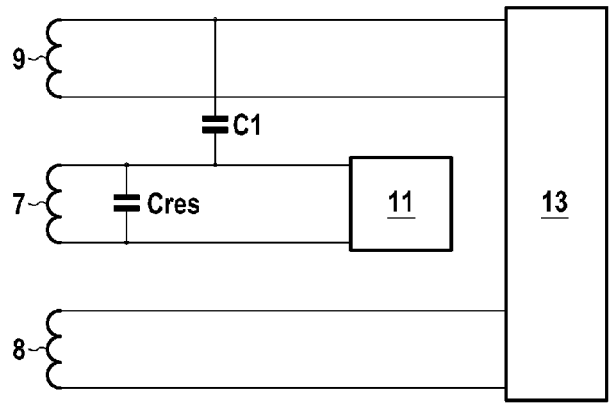
FIGS. 2A to 2C are diagrams illustrating different variants of a second embodiment by capacitive coupling, of a position sensor according to the invention.
Figure 2B:
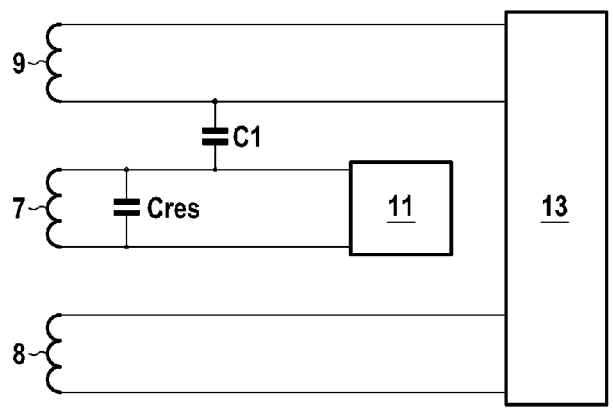
Figure 2C:
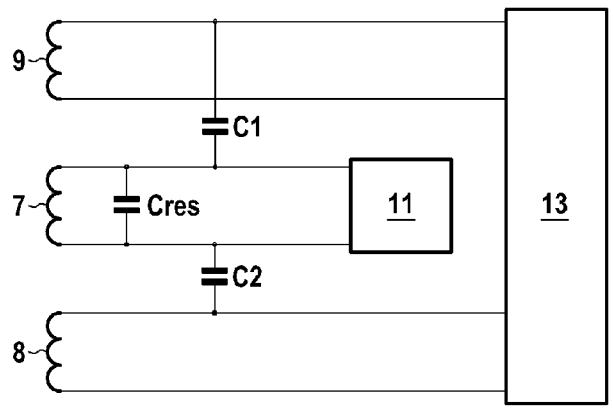

According to a second embodiment, the coupling balancing system includes at least one compensation capacitor mounted between the primary coil 7 and a secondary coil 8, 9. FIGS. 2A to 2C illustrate compensation by capacitive coupling of the measurement offset. These Figures show the resonance capacitor Cres mounted on the primary coil 7.

Thus, at least one compensation capacitor C1, C2 is mounted between the primary coil 7 and a secondary coil 8, 9. The value of the capacitance of the compensation capacitor is determined by iterative tests. In the example illustrated in FIG. 2A, the compensation capacitor C1 is mounted between the primary coil 7 and the cosine secondary coil 9 while in the example illustrated in FIG. 2B, the compensation capacitor C1 is also mounted between the primary coil 7 and the cosine secondary coil 9 but with an opposite way of compensation. In the example illustrated in FIG. 2C, a first compensation capacitor C1 is mounted between the primary coil 7 and the cosine secondary coil 9 and a second compensation capacitor C2 is mounted between the primary coil 7 and the sine secondary coil 8.

According to a third embodiment, the coupling balancing system is produced by a modulation of the shape of the secondary coils 8, 9 to ensure a decrease in the shape of the coils located at the end segments 7b. Thus, the shapes of the sine and cosine functions of the secondary coils 8, 9 decrease towards the end segments 7b of the primary coil 7.

For a linear path, the shapes of the outward track 8a and of the return track 8r of the sine secondary coil 8 are described by the following formulation:

$$y\text{outward}(x) = Y\text{moy\_outward} + E(x)*(A1*\sin(a*x+\phi1) + A2*\sin(2*a*x+\phi2) + A3*\sin(3*a*x+\phi3) \ldots + An*\sin(n*a*x+\phi n));$$

$$y\text{return}(x) = Y\text{moy\_return} + E(x)*(-A1*\sin(a*x+\phi1) - A2*\sin(2*a*x+\phi2) - A3*\sin(3*a*x+\phi3) \ldots - An*\sin(n*a*x+\phi n));$$

and the shapes of the outward track 9a and of the return track 9r of the cosine secondary coil 9 are described by the following formulation:

$$y\text{outward}(x) = Y\text{moy\_outward} + E(x)*(A1*\cos(a*x+\phi1) + A2*\cos(2*a*x+\phi2) + A3*\cos(3*a*x+\phi3) \ldots + An*\cos(n*a*x+\phi n));$$

$$yreturn(x) = Ymoy\_return + E(x)*(-A1*\cos(a*x+\phi1) - A2*\cos(2*a*x+\phi2) - A3*\cos(3*a*x+\phi3) \ldots -An*\cos(n*a*x+\phi n));$$

with:
- x, y, the Cartesian coordinates in the Cartesian coordinate system considered along the path F of the moving body and along a direction perpendicular to the path and parallel to the plane of displacement of the target;
- E(x), an wrapper function;
- A1, the amplitude of the fundamental component of the track;
- A2 to An, the amplitudes of the harmonic components of the track, with n less than 5;
- a, a proportionality factor making it possible to adapt the period of the secondary coils to the stroke to be measured;
- φ1, the phase of the fundamental component of the track;
- φ2 to φn, phases of the harmonic components of the track
- $Y_{moy\_outward}$ and $Y_{moy\_return}$, the Y coordinates of the mean lines of the outward and return tracks respectively.

According to an advantageous variant, the coordinates $Y_{moy\_outward}$ and $Y_{moy\_return}$ of a secondary coil are different so that the outward track of the secondary coil is shifted with respect to the return track of said secondary coil.

The wrapper function E(x) is a modulation function of the sine and cosine functions allowing a decrease in the shape of the tracks of the secondary coils towards the end segments 7b.

Typically, the wrapper function E(x) is the result of the sum of a constant K and of a sinusoidal modulation function of the same period as the fundamental component of the secondary coils such as:

$$E(x) = K + M*\sin(a*x+\phi_m) \text{ for } Xstart \leq X \leq Xend;$$

$$E(X) = 0 \text{ for } X \leq Xstart;$$

$$E(X) = 0 \text{ for } X \geq Xend;$$

with Xstart and Xend defining respectively the start and the end of the sector occupied by the secondary coils 8, 9.

Advantageously, the phase $\phi_m$ of the sinusoidal modulation function is chosen such that the wrapper function E(X) has a maximum at the center of the primary coil 7.

Another advantageous configuration of the wrapper function E(x) is a trapezoidal function such as represented in FIG. 3. In this case, the wrapper function can be described such that, it is zero for X≤Xstart, then it increases linearly on a first sector, the following sector is constant, before a last sector which decreases linearly until Xend, then again for X≥Xend the wrapper function is zero.

The distribution of the different sectors of the function is advantageously chosen so that the wrapper function attenuates the contribution of the meshes closest to the ends 7b.

FIG. 4 is an exemplary embodiment of the secondary coils 8, 9 whose shape includes harmonics of order 2. The sine-shaped secondary coil 8 consists of an outward track 8a and of a return track 8r forming, a first mesh and a second mesh whose shape located in the vicinity of the end segments 7b of the primary coil 7 is attenuated to compensate for the impact of the non-homogeneity of the magnetic field over the entire area of the secondary coils. The cosine-shaped secondary coil 9 consists of an outward track 9a and of a return track 9r forming, a first half-mesh, a complete mesh and a second half-mesh so that the half-meshes each located in the vicinity of an end segment 7b of the primary coil 7 has an attenuated shape to compensate for the impact of the non-homogeneity of the magnetic field over the entire area of the secondary coils. The outward track 9a and the return track 9r of the cosine secondary coil 9 are linked, at their ends, by a linking track 91 extending perpendicularly to the path F.

According to an advantageous variant, the wrapper function E(x) has a maximum value at the center of the primary coil 7.

Of course, this third embodiment of the balancing system can be implemented in combination with the second embodiment as well.

FIG. 5 illustrates the adaptation of the third embodiment for an angular path F of the target 3 rotating around the center C. According to this example, the secondary coils 8, 9 are arranged in the shape of a circular ring section of angular width limited for example by the angle desired to be measured.

FIG. 5 illustrates by way of example the shape of the secondary coils 8, 9 ensuring a decrease in the shape of the coils located at the end segments 7b, and as represented in FIG. 4. The shapes of the outward track 8a and of the return track 8r of the sine secondary coil 8 are described by the following formulation:

$$Youtward(\theta) = Ymoy\_outward + E(\theta)*(A1*\sin(a*\theta+\phi1) + A2*\sin(2*a*\theta+\phi2) + A3*\sin(3*a*\theta+\phi3) \ldots + An*\sin(n*a*\theta+\phi n));$$

$$Yreturn(\theta) = Ymoy\_return + E(\theta)*(-A1*\sin(a*\theta+\phi1) - A2*\sin(2*a*\theta+\phi2) - A3*\sin(3*a*\theta+\phi3) \ldots - An*\sin(n*a*\theta+\phi n)).$$

The shapes of the outward track 9a and of the return track 9r of the cosine secondary coil 9 are described by the following formulation:

$$Youtward(\theta) = Ymoy\_outward + E(\theta)*(A1*\cos(a*\theta+\phi1) + A2*\cos(2*a*\theta+\phi2) + A3*\cos(3*a*\theta+\phi3) \ldots + An*\cos(n*a*\theta+\phi n));$$

$$Yreturn(\theta) = Ymoy\_return + E(\theta)*(-A1*\cos(a*\theta+\phi1) - A2*\cos(2*a*\theta+\phi2) - A3*\cos(3*a*\theta+\phi3) \ldots - An*\cos(n*a*\theta+\phi n));$$

with:
- θ, the angular coordinate in the polar coordinate system whose center corresponds to the axis of rotation C of the target 3;
- a, a proportionality factor making it possible to adapt the period of the secondary coils to the stroke to be measured;
- $Y_{moy\_outward}$ and $Y_{moy\_return}$ the mean radii of the outward and return tracks respectively;
- E(θ), the wrapper function.

According to an advantageous variant, the wrapper function (E(θ) has a maximum value at the center of the primary coil 7.

The invention is not limited to the examples described and represented because various modifications can be made thereto without departing from its scope.

The invention claimed is:

1. An inductive position sensor for determining the position of a moving body along a linear or rotary path, including:
   - a target moving along the path adapted to modify an electromagnetic field;
   - a fixed circuit board extending in relation to the target along a limited portion with respect to the path and including a primary coil surrounding two secondary coils having substantially identical lengths and having shapes of sine and cosine functions, each secondary coil including at least one outward track and at least one return track;

a current generator for the primary coil or the secondary coils to create between the primary coil and the secondary coils an inductive coupling modulated by the position of the target;

a detector of the linear or angular position of the target from the induced signals derived from the secondary coils or from the primary coil;

and a system for balancing the coupling between the primary coil and the secondary coils to compensate for the measurement offset induced by the proximity between the secondary coils and the end segments of the primary coil;

wherein the coupling balancing system includes at least one compensation capacitor mounted between the primary coil and a secondary coil.

2. The sensor according to claim 1, wherein the length of the primary coil is greater than the length of the secondary coils so that each end segment of the primary coil is located with respect to the neighboring ends of the secondary coils, at a distance of less than 10 millimeters or ¼ of the period of the secondary coils.

3. An inductive position sensor for determining the position of a moving body along a linear or rotary path, including:

a target moving along the path adapted to modify an electromagnetic field;

a fixed circuit board extending in relation to the target along a limited portion with respect to the path and including a primary coil surrounding two secondary coils having substantially identical lengths and having shapes of sine and cosine functions, each secondary coil including at least one outward track and at least one return track;

a current generator for the primary coil or the secondary coils to create between the primary coil and the secondary coils an inductive coupling modulated by the position of the target;

a detector of the linear or angular position of the target from the induced signals derived from the secondary coils or from the primary coil;

and a system for balancing the coupling between the primary coil and the secondary coils to compensate for the measurement offset induced by the proximity between the secondary coils and the end segments of the primary coil;

wherein the coupling balancing system includes for at least one secondary coil, at least one shift between the mean line or the mean radius of the outward track and the mean line or the mean radius of the return track of said secondary coil, along a direction perpendicular to the path and along a way ensuring a decrease in the shape of the secondary coil located at the end segments of the primary coil.

4. The sensor according to claim 3, wherein the shift between the mean line or mean radius of the outward track and the mean line or mean radius of the return track of said secondary coil is symmetrical with respect to the mean line or radius of the tracks of the other coil.

* * * * *